(12) United States Patent
Bentrim

(10) Patent No.: US 6,866,456 B2
(45) Date of Patent: Mar. 15, 2005

(54) FLOATING CAPTIVATED WRENCHABLE NUT

(75) Inventor: Brian G. Bentrim, Hatfield, PA (US)

(73) Assignee: PEM Management, Inc., Wilmington, DE (US)

( * ) Notice: Subject to any disclaimer, the term of this patent is extended or adjusted under 35 U.S.C. 154(b) by 0 days.

(21) Appl. No.: 10/449,013

(22) Filed: Jun. 2, 2003

(65) Prior Publication Data

US 2004/0240961 A1 Dec. 2, 2004

(51) Int. Cl.$^7$ ............................................. F16B 39/10
(52) U.S. Cl. ..................... 411/353; 411/999; 411/533
(58) Field of Search ................................ 411/353, 999, 411/533, 183

(56) References Cited

U.S. PATENT DOCUMENTS

| | | | |
|---|---|---|---|
| 3,238,581 A | * 3/1966 | Sawyer | ........................ 24/71 T |
| 4,254,809 A | 3/1981 | Schuster | |
| 4,919,578 A | 4/1990 | Zeigler et al. | |
| 4,969,788 A | * 11/1990 | Goiny | ........................ 411/428 |
| 4,973,208 A | 11/1990 | Gauron | |
| 5,006,025 A | * 4/1991 | Duran | ........................ 411/183 |
| 5,314,281 A | 5/1994 | Turlach et al. | |
| 5,378,099 A | 1/1995 | Gauron | |
| 5,397,205 A | 3/1995 | Diepeveen | |
| 5,639,113 A | * 6/1997 | Goss et al. | ............. 280/728.2 |
| 5,779,409 A | 7/1998 | Manzolli | |
| 5,779,418 A | 7/1998 | Ying-Che | |
| 5,842,894 A | * 12/1998 | Mehlberg | ........................ 439/801 |
| 5,868,535 A | 2/1999 | Ladouceur | |
| 5,924,831 A | 7/1999 | Ricks et al. | |
| 5,975,821 A | * 11/1999 | Kue | ........................ 411/533 |
| 6,045,309 A | 4/2000 | LeVey | |
| 6,486,402 B2 | 11/2002 | Harger et al. | |

* cited by examiner

*Primary Examiner*—Flemming Saether
(74) *Attorney, Agent, or Firm*—Gregory J. Gore

(57) ABSTRACT

A two-piece fastening system utilizes separate parts, a nut and a retainer, which are securely united from opposite sides of the captivating element such as a sheet or panel. The nut body which has an axial threaded bore includes an integral collar located on one side of the nut having an outside diameter less than the outside diameter of the nut body. A tubular shank unitary with the nut body extends coaxially from the collar, the outside diameter of the shank being less than the outside diameter of the collar. The shank includes an expandable portion near its end which is deformable to provide attachment to the second part, a retainer, which has a bore that receives the expandable portion of the shank. The retainer bore includes an inside wall against which the expandable portion of the shank is forced to achieve attachment of the parts. The width of the retainer is preferably greater than the length of the shank so that once attached, the end of the shank is below the endface of the retainer. The inner face of the retainer abuts an annular end of the collar so that forces between the retainer and a threadably attached part cannot be transferred through the deformable portion of the shank. The retainer may be composed of a harder material or one that provides reduced friction to enhance its capability as a rotational, load-bearing surface. The two parts are assembled to the panel by inserting the tubular shank of the nut through the panel aperture, installing the retainer over the shank from the opposite side of the panel, and then deforming the shank against the inner wall of the retainer.

17 Claims, 1 Drawing Sheet

FLOATING CAPTIVATED WRENCHABLE NUT

FIELD OF THE INVENTION

The present invention relates to threaded fasteners and more particularly to fasteners which are captively attached to a sheet or panel. More specifically, it relates to a captivated nut attached to a panel by joining two separate elements from opposite sides of the panel.

BACKGROUND OF THE INVENTION

There are known in the art fasteners which function as an internally threaded nut with the benefit of being captivated to an element of the application such as a sheet or panel. A typical configuration of a fastener captivated in a sheet is a simple threaded nut with female threads which utilizes a hex shape body to allow turning by a tool to turn the nut. Such a fastener is shown for example in U.S. Pat. No. 6,486,402 issued to Harger et al. which discloses a loosely-held rivet type nut rotatably secured to a strap. The nut is attached to the strap by a staking shaft which extends from the backside of the nut. The shaft is first inserted through an aperture in the strap and then flared on the opposite side of the strap to a diameter greater than the aperture. This provides a loose riveting of the nut which permits it to be rotatable while being secured to the strap.

Simple, one-piece fasteners of this type provide the advantages and convenience of captivation, however there are problems. Spacing between the captivation element such as a sheet or panel and the attached part cannot be easily or accurately controlled and many applications have the need for spacing to be predetermined to accommodate a minimum clearance between the components to be joined. In larger applications, tolerance stack-up can also present a problem, especially in an environment subject to significant changes in temperature where a desired spacing may be lost due to the relative variations in the size of the parts because of their different coefficients of expansion. An accurately predetermined spacing may also be needed where a gasket is employed between the joined parts. Yet another problem is the force limitation of the flare or rivet on the backside of the nut because that portion of the material may be too compliant to sufficiently counteract high attachment forces against an attached component. There is therefore a need in the art for a captive nut assembly to overcome these problems.

SUMMARY OF THE INVENTION

In order to solve the problems in the art described above, the present invention has been devised. It comprises a two-piece fastening system utilizing separate parts, a nut and a retainer, which are securely united from opposite sides of the captivating element such as a sheet or panel. The nut body which has an axial threaded bore includes an integral collar located on one side of the nut having an outside diameter less than the outside diameter of the nut body. A tubular shank unitary with the nut body extends coaxially from the collar, the outside diameter of the shank being less than the outside diameter of the collar. The shank includes an expandable portion near its end which is deformable to provide attachment to the retainer.

The second part, the retainer, has a bore in which the expandable portion of the shank is received. The retainer bore includes an inside wall against which the expandable portion of the shank is forced to achieve attachment of the parts. In the preferred embodiment the wall of the retainer is frustoconical and convergent in the direction of the body. The width of the retainer is preferably greater than the length of the shank so that once attached, the end of the shank is below the endface of the retainer. The inner face of the retainer abuts an annular end of the collar so that forces between the retainer and a threadably attached part cannot be transferred through the deformable portion of the shank. The retainer may be composed of a harder material or one that provides reduced friction to enhance its capability as a rotational, load-bearing surface. This two-part nut of the invention is assembled to the panel by inserting the tubular shank of the nut through the panel aperture, installing the retainer over the shank, and then deforming the shank against the inner wall of the retainer.

As will be more fully described herein, the use of separate parts rather than deforming a single part provides many advantages and a much broader range of design freedom in providing an application with a captivated internally-threaded wrenchable nut. Because the shank of the nut is installed sub-flush in the retainer, the bearing load against the backside of the fastener is supported by the retainer rather than the deformable element of the nut. Thus, attachment forces are more rigidly transferred to the body of the nut providing a more secure joinder of parts and preventing over-deformation of the shank which could lock the nut to the panel. Also, the present invention allows the separate parts to be made of different materials, each for its desired characteristic. This is highly desirable since otherwise the deformable element must necessarily be relatively compliant, while as a bearing surface it is also required to be hard. Another beneficial characteristic of the invention is that the shank need only be deformed enough to attach the retainer rather than expanded to a larger diameter greater than the mounting aperture. Since a lesser degree of deformation is required, a harder material may be used and the joint between the parts can be stronger. In addition, under conditions of high friction between the retainer and the bearing load, the separate retainer is capable of rotating on the shank of the nut, while a unitary part is not. This can prevent damage to both the fastener and the threadably attached element. As yet another advantage, the attachment gap between the captivation element and structures of the nut can be accurately controlled by the width of the collar which is located between the nut body and the retainer. This permits a tighter tolerance of the nut assembly which provides for a loose but closely-held nut. Further benefit can be provided by oversizing the attachment aperture in the panel or sheet to allow the fastener to "float" in order to compensate for misalignment of the mating threaded part or attachment aperture. The amount of float is limited only by the diameters of the retainer and nut body which are independent of the degree of shank deformation. Other objects and advantages of the invention will be readily apparent from the following drawings and description of the preferred embodiment.

DESCRIPTION OF THE PREFERRED EMBODIMENT

Figure 1:
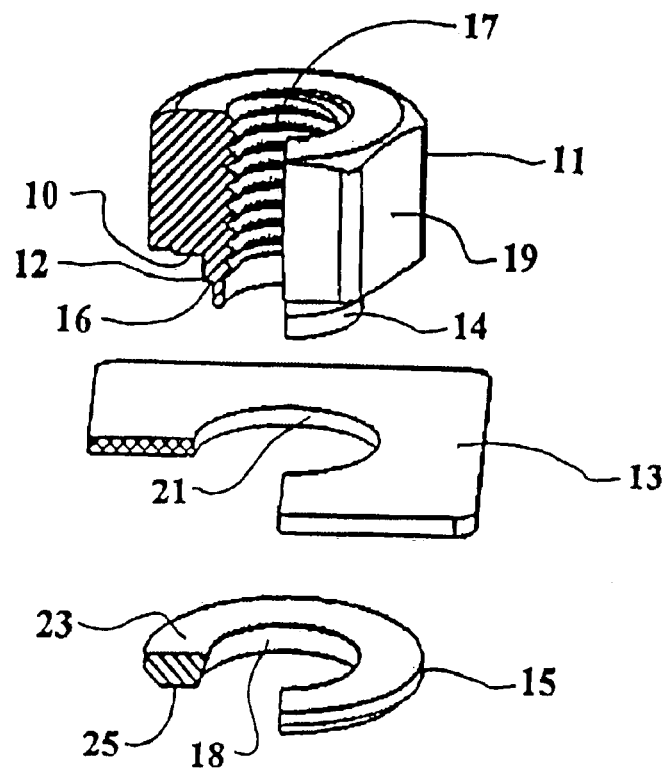
FIG. 1 is a top front partly sectioned isometric assembly view of the invention.

Referring now to FIG. 1, the three main components of the assembly of an embodiment of the invention include the nut body 11, captivating element 13 such as a sheet or a panel, and retainer 15 which is secured to the shank of the nut body on the opposite side of the panel. The nut body preferably includes internal threads 17 and wrenchable flats 19 about its periphery for rotation by a tool. The nut body further includes an integral collar 12 and a deformable shank 14 which extends axially from the collar. The collar has an annular end 16 for engaging the abutment surface 23 of the retainer. A raised area 10 at the base of the nut body provides a shallow stand-off from the panel. Panel 13 includes an aperture having an edge 21 that may be sized substantially greater than the shank. Retainer 15 includes an axially tapered inner wall 18 providing a frustoconical surface convergent in the direction of the nut body and further includes a chamfered endface 25.

Figure 2:
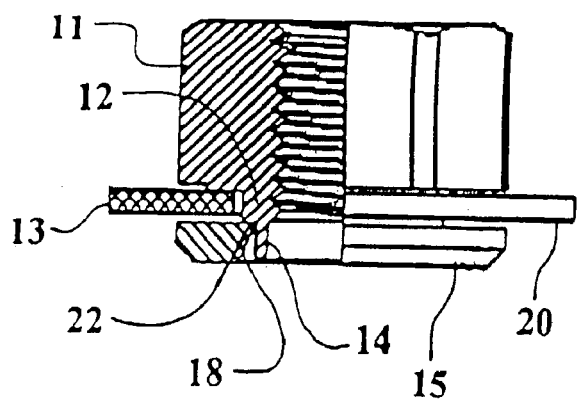
FIG. 2 is a partially sectioned front view of the invention at an intermediate stage of assembly.

Referring now to FIG. 2, the nut body 11 of the invention is shown positioned for attachment to panel 13 with collar 12 and shank 14 extending through the aperture in the panel. The retainer 15 is positioned on the opposite side of the panel with inner wall 18 lying over the shank 14 and with the abutment surface of the retainer laying against the end of collar 12 at joint 22. As will be readily apparent from this view, the width of collar 12 is greater than that of panel 13 providing a rigid structural gap 20 between the nut assembly and the panel.

Figure 3:
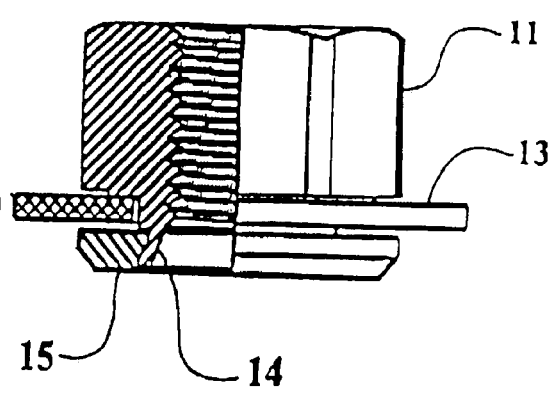
FIG. 3 is a partially sectioned front view of the invention completely assembled.

Referring now to FIG. 3, the same view as shown in FIG. 2 is depicted except that shank 14 has been deformed against the inner wall of retainer 15 thereby uniting the retainer with the nut body and securely captivating the nut assembly 11 to the panel 13. As can be seen from this view, there is also a substantial gap between the collar of the nut body and the edge of the aperture of panel 13 thus permitting the nut assembly to move laterally or float, which may be required by the threaded engagement of misaligned parts. Also, this figure illustrates that the shank need only be minimally deformed, the greatest outside diameter of the flared shank being less than the aperture in panel 13. Also, as further depicted, the length of the shank 14 is slightly less than the width of the retainer providing a sub-flush attachment of the retainer to the nut body. This ensures that the deformable portion of the shank will not contact any components which are secured by the nut.

Thus, it will be appreciated that the objects of the invention have been achieved by the described preferred embodiment. It should be understood however that there may be other modifications and changes to the present invention that will be obvious to those of skill in the art from the foregoing description, however, the present invention should be limited only by the following claims and their legal equivalents.

What is claimed is:

1. A captive nut assembly for loose attachment to an apertured element such as a sheet or panel, comprising:

a nut body having an axial threaded bore;

a collar located on a first side of said nut body, said collar having an outside diameter less than the outside diameter of said nut body;

a tubular shank unitary with said nut body and coaxially extending from said first side of said nut body, said shank having an axial bore and an outside diameter less than the outside diameter of the collar;

an expandable portion of said shank; and a retainer having a thickness greater than the length of said tubular shank and a bore in which said expandable portion of the shank is received, said bore including an inside wall whereby said retainer is axially securable to said nut body by the deformation of said shank along its entire length against only the inside wall of the retainer.

2. The captive nut assembly of claim 1 wherein said inside wall of said retainer is frustoconical and convergent in the direction of said nut body.

3. The captive nut assembly of claim 2 further described in that said collar includes an annular endface abutting said retainer.

4. The captive nut assembly of claim 2 wherein said collar is unitary with said nut body.

5. The captive nut assembly of claim 4 wherein said frustoconical inner wall extends the entire thickness of the retainer.

6. The captive nut assembly of claim 5 wherein said retainer is circular.

7. The captive nut assembly of claim 6 wherein the endface of said retainer is chamfered.

8. The captive nut assembly of claim 7 wherein said nut body further includes tool engagement means for rotating the nut body.

9. The captive nut assembly of claim 1 wherein said nut body and said retainer are composed of different materials, said retainer being of greater hardness than said nut body.

10. An assembly of parts comprising:

a nut assembly comprising: <a nut body having an axial threaded bore;

a collar located on a first side of said nut body, said collar having an outside diameter less than the outside diameter of said nut body;

a tubular shank unitary with said nut body and coaxially extending from said first side of said nut body, said shank having an axial bore and an outside diameter less than the outside diameter of the collar;

an expandable portion of said shank; and a retainer having a thickness greater than the length of said tubular shank and a bore in which said expandable portion of the shank is received, said bore including an inside wall and said retainer is axially secured to said nut body by the deformation of said shank along its entire length against only the inner wall of the retainer; and a captivating element having an aperture in which said shank is received, the edge of said element around said aperture lying between said nut body and said retainer wherein a portion of the collar lies within the aperture.

11. The assembly of claim 10 wherein said inside wall of said retainer is frustoconical and convergent in the direction of said nut body.

12. The assembly of claim 11 further described in that said collar includes an annular endface abutting said retainer.

13. The assembly of claim 11 wherein said nut body and said retainer are composed of different materials, said retainer being of greater hardness than said nut body.

14. The assembly of claim 10 wherein said collar is unitary with said nut body.

15. The assembly of claim 14 wherein the aperture is substantially greater than the outer diameter of the collar.

16. The assembly of parts of claim 15 wherein the diameter of the retainer inner wall is less than the diameter of the aperture.

17. The assembly of parts of claim 16 wherein said nut body further includes tool engagement means for rotating the nut body.

* * * * *